Jan. 17, 1928. 1,656,661
G. C. CARHART
BRAKE BAND OPERATING MECHANISM
Filed Aug. 22, 1923 2 Sheets-Sheet 1

George C. Carhart, INVENTOR.
BY
Parsons Bodell, ATTORNEYS.

Jan. 17, 1928.
G. C. CARHART
1,656,661
BRAKE BAND OPERATING MECHANISM
Filed Aug. 22, 1923
2 Sheets-Sheet 2
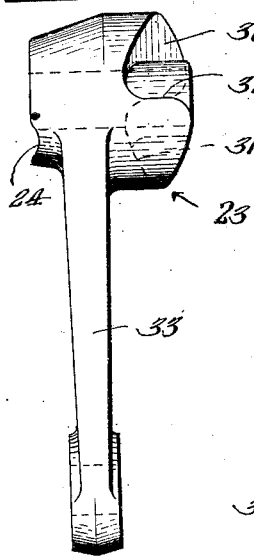
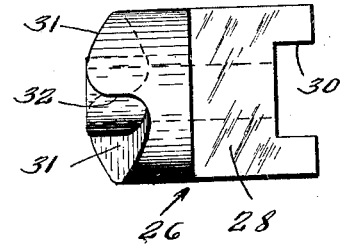
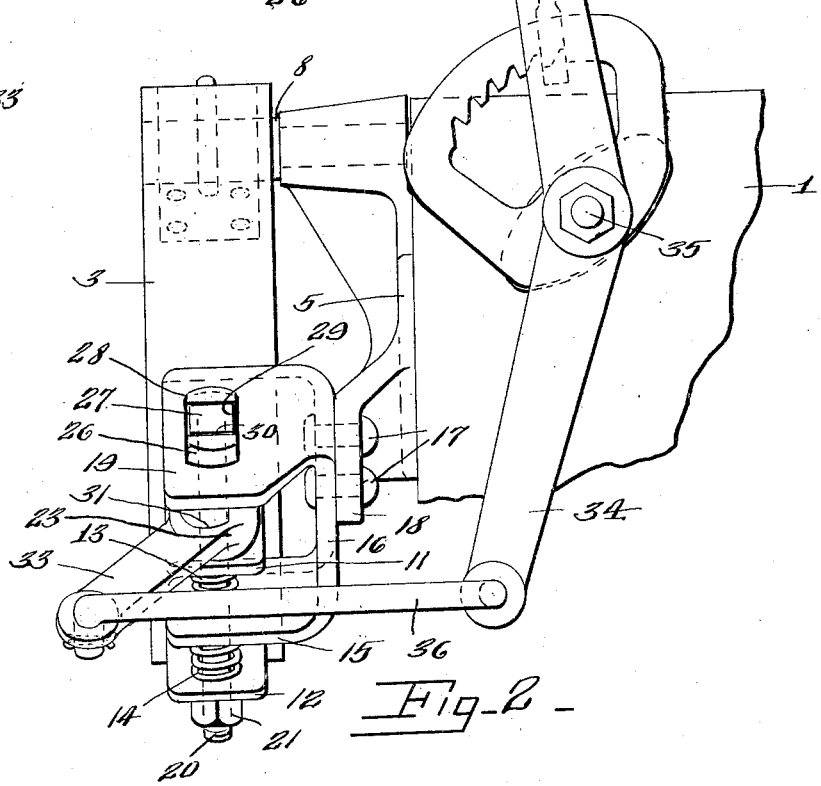
INVENTOR.
BY
ATTORNEYS.

Patented Jan. 17, 1928.

1,656,661

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

BRAKE-BAND-OPERATING MECHANISM.

Application filed August 22, 1923. Serial No. 658,794.

This invention relates to vehicle brakes such as are used in motor vehicles, that is, band brakes which either expand or contract to engage with the brake drum.

It has for its object a particularly simple mechanism for effecting or controlling the application of the brake or the expanding or contracting as the case may be of the brake band.

The invention consists in the novel features and in the combinations and constructions hereinafter set forth and claimed.

In describing this invention reference is had to the accompanying drawings in which like characters designate corresponding parts in all the views.

Figure 2 is a side elevation looking to the left of the parts shown in Figure 1, parts being omitted.

Figures 3 and 4 are detail views of the cam and the cam collar of the operating means of the brake.

Figure 1:
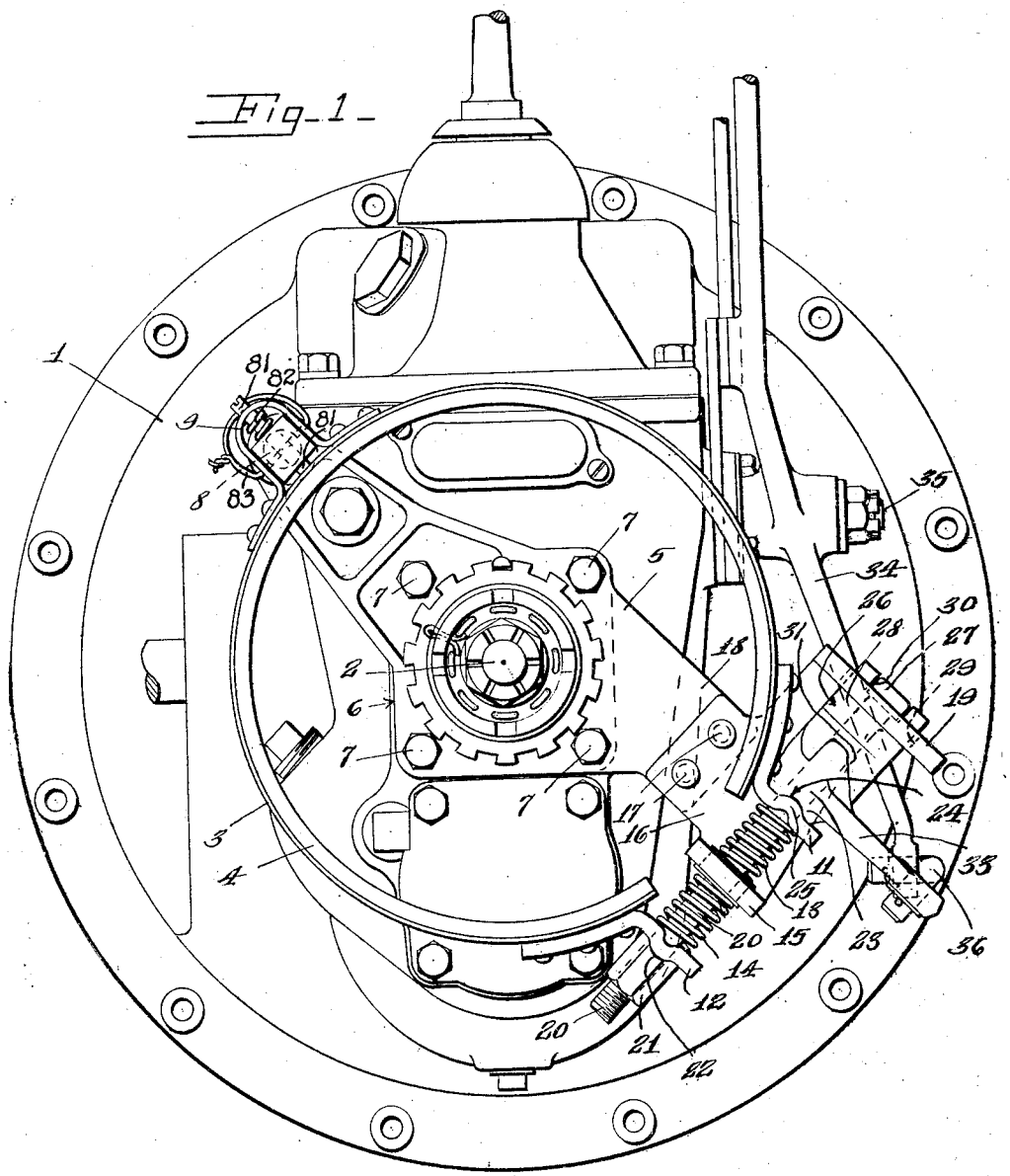
Figure 1 is an elevation of an external brake mechanism embodying my invention, the brake mechanism being shown as applied to the driven shaft of the transmission gearing, which gearing is shown in rear elevation.

Although this brake mechanism is shown as applied to the transmission gearing, it may be supported on any other part of the vehicle.

1 designates the case of the transmission gearing, 2 is the driven shaft of the gearing, which is coupled by a universal joint to the propeller shaft of the vehicle, 3 designates the brake band and 4 the lining thereof, the brake band being here shown, as externally contracting band for contracting into braking position, and expanding out of braking position. The brake band is supported in any suitable manner, and as here shown, it is carried by a support or arm 5, which extends laterally or in a radial direction from the bearing cup 6 of the shaft 2, this cup being secured to the case 1, in any suitable manner, as by screws 7. The brake band is supported on a laterally extending stud 8, at the end of the arm 5, and is provided with a U-shaped loop 9, extending radially substantially, which loop is secured to the stud in any well known manner. The stud 8 as here shown has a round stem and a square head slidable between the arms of the loop and the brake band is adjusted in its initial position and also to take up for wear by a set screw 81 threading through the square head and thrusting against the brake band at one end. A spring 82 is interposed between the outer end of the loop and the head, the spring surrounding the screw. In adjusting the brake band the screw is screwed downwardly so that its inner end presses against the brake band and to loosen the brake band the screw is turned accordingly to permit the compression spring 82 pressing against the loop 9 to pull the brake away from the brake drum slightly. The parts are held in their adjusted position by a wire 83 threading through the block in any suitable manner at one side of or back of the loop and through a hole in the outer end of the screw. This adjustment forms no part of this invention. The brake band 3, also is provided with outwardly extending lugs 11, 12 at its ends, these lugs being spaced apart, and the operating means coacts with these lugs to force them toward each other and contract the brake band. The band is normally held in expanded position by spring means. As here illustrated, the brake band is held expanded by springs 13, 14 interposed between lugs 11, 12 respectively and opposite sides of an abutment 15 carried by the support 5 and located between the lugs 11 and 12. The abutment 15 is here shown as provided on a bracket 16 secured as by rivets 17 to an arm 18 of the support 5, which arm 18 extends in the opposite direction from the bearing cup 6, from that arm which supports the brake band. This bracket 16 also is formed with an abutment 19 located outside of the lug 11 and spaced apart therefrom.

The means for operating the brake, that is, for contracting it in this instance, comprises a movable rod 20, extending through the abutment 19 and lug 11, abutment 15 and lug 12, and means mounted on the rod and movable about the axis thereof for moving the lugs toward each other against the springs 13, 14. The rod, as here shown, is an endwisely movable bolt having an adjustable shoulder or nut 21 at one end thrusting against the outer face of the lug 12, this nut having a transverse groove in its end face for receiving a transverse corrugation 22 in the outer face of the lug 12 in order to hold the nut from turning, the nut being adjustable to adjust or take up the brake band for wear.

The means for operating the rod 20 endwisely, as here illustrated, comprises a cam 23 mounted on the rod on the outer or upper side of the lug 11, that is, between the lug 11, and the abutment 19, this cam acting when operated to thrust downwardly on the lug 11 and upwardly on the rod 20 or to push the lug 11 downwardly against the spring 13 and push the rod 20 to draw the lug 12 upwardly against the resistance of the spring 14. As here illustrated, the cam coacts directly with the lug 11 and acts on the rod 20 through a collar on the rod, and the lug 11 and the cam 23 are here shown formed with coacting cam faces at 24.

These cam faces are formed by providing the cam 23 with a transverse groove and the lug 11 with a complemental corrugation 25, similar to the corrugation 22 on the lug 12. The cam 23 acts indirectly on the bolt or rod 20 to pull it endwisely through a collar 26 mounted on the bolt 20 and thrusting against the head 27 of the bolt, the collar 26 being held from rotation, it being here shown as having a non-circular or square shank 28 slidable in the slot 29 in the abutment 19. The shank 28 is also formed with a socket 30 for receiving the square bolt head 27 and holding the rod from turning. The cam 23 and also the collar 26 is provided with coacting cam faces at 31, the faces being of greater inclination or lift than the cam face between the cam 23 and the lug 11, so that, upon the turning of the cam 23 the cam faces between the cam 23 and the lug 11 act with the surfaces 31 and thereafter the inclined surfaces 31 act alone to further contract the brake band with gradually increasing force or leverage.

There are two surfaces 31 and also the cam 23 and collar 26 are provided with stop shoulders 32 which engage when the brake is in its normally expanded position.

The cam 23 is provided with an outwardly extending arm 33, by means of which it is operated, this arm being connected to a lever 34 pivoted at 35 to the casing of the transmission gearing and connected by a link 36 to the lever 33.

In operation, upon movement of the lever 34, the cam 23 is moved about the rod 20 and the cam surfaces 24, 31 act to initially contract the brake band by pushing down on the lug 11 and pushing up on the collar 26 and head 27 of the bolt 20, thus drawing the bolt 20 upwardly causing the shoulder 21 to draw the lug 12 upwardly.

Such movement of the cam 23 by the arm 33 causes the inclined surfaces at 31 of the cam to slide along the inclined surfaces of the collar 26 and further movement of the cam causes the inclined surfaces 31 of the cam to further slide along the inclined surfaces of the collar 26 and apply the braking force with increasing effect or leverage by pushing downwardly on the lug 11 and pulling upwardly on the bolt or rod 20.

What I claim is:

1. A brake mechanism, comprising an expanding and contracting brake band, having spaced apart outwardly extending lugs, means for controlling the operation of the brake band, comprising an endwisely movable rod extending through the lugs, and having a shoulder acting on one of the lugs, a collar on the rod, the collar being formed with a cam movable endwisely with the rod, a cam interposed between the collar and the other of the lugs and coacting with the cam on said collar and the lug, and actuation means for moving the second cam about the rod.

2. A brake mechanism, comprising an expanding and contracting brake band, having spaced apart outwardly extending lugs, means for controlling the operation of the brake band, comprising an endwisely movable rod extending through the lugs, and having a shoulder acting on one of the lugs, a cam mounted on the rod and fixed from rotation and movable endwisely therewith, a second cam interposed between the first cam and the other of the lugs, and coacting with the first cam and the other lug, and actuation means for moving the second cam about the rod, and spring means acting on the lugs in opposition to the cam and said shoulder.

3. A brake mechanism, comprising an expanding and contracting brake drum, having spaced apart outwardly extending lugs, a rod extending through the lugs, and having a shoulder acting on the outer face of one of the lugs, a cam mounted on the rod and movable about the axis thereof, and coacting with the outer face of the other lug, the cam also having a cam face on the side thereof, opposite to that engaged with such other lug, a second cam mounted on the rod and being fixed from rotation and movable endwisely with the rod, and coacting with the second face of the former cam, and means for operating the former cam.

4. A brake mechanism, comprising an expanding and contracting brake band, having spaced apart outwardly extending lugs, spring means acting on the inner face of the lugs and tending to separate them, a rod extending through the lugs, the rod being movable endwisely, and having a shoulder thrusting against the outer face of one of the lugs, a cam mounted on the rod and movable about the same, and acting on the outer face of the other of the lugs, a collar mounted on the rod and fixed from rotation and movable endwisely with the rod and coacting with the cam, the cam having cam faces on opposite sides thereof coacting with such other lug and with the collar, and means for actuating the cam.

5. A brake mechanism, comprising a brake band support, an expanding and contracting spaced apart brake band, carried by the support, and having outwardly extending lugs at its end, the support having an abutment extending between the lugs, also having a second abutment located outside of, and spaced apart from one of the lugs, a rod extending through the lugs and through the abutments, the rod being movable endwisely and having a shoulder abutting against the outer face of the other of the lugs, a collar mounted on the rod adjacent to the second abutment, and connected to the rod to move endwisely therewith and to the second abutment to be held from rotation, a cam mounted on the rod and movable about the axis thereof, and interposed between the collar and the outer face of the adjacent lug, the cam and the collar having coacting cam faces, and the adjacent lug and the cam having coacting cam faces, and springs interposed between the inner faces of the lugs and opposite sides of the first abutment.

6. A brake mechanism comprising a support, a split brake band mounted between its ends on the support and formed with outwardly extending lugs at its ends, a bracket carried by the support and having an abutment spaced apart from the outer side of one of the lugs, an endwise movable rod extending through the abutment and the lugs, a cam mounted on the rod between said one of the lugs and the abutment and operable to thrust such lug in one direction to contract the brake band and thrust the rod in the opposite direction, the rod having a shoulder thrusting against the outer face of the other lug and means for moving the cam about its axis.

7. A brake mechanism comprising a support, a split brake band carried between its ends by the support and having outwardly extending lugs at its ends, a bracket carried by the support and provided with an abutment extending between the lugs and an abutment spaced apart from the outer side of one of the lugs, a rod extending endwise through the abutments and the lugs and having a shoulder thrusting against the outer face of the other lug, a cam mounted on the rod between the first mentioned lug and the outer abutment and being movable about the rod to move the rod endwise in one direction and thrust the lug coacting therewith in the opposite direction, springs interposed between the inner sides of the lugs and the abutment located between the lugs and means for operating the cam.

In testimony whereof, I have hereunto signed my name, at Syracuse, in the county of Onondaga, and State of New York, this 16th day of August, 1923.

GEORGE C. CARHART.